April 12, 1966 W. ZORN 3,245,134
CUTTING TOOL WITH CUTTER BARS SECURED TO A SUPPORTING BODY
AND METHODS OF PRODUCING THE SAME
Filed April 3, 1963 4 Sheets-Sheet 1

April 12, 1966            W. ZORN            3,245,134
CUTTING TOOL WITH CUTTER BARS SECURED TO A SUPPORTING BODY
AND METHODS OF PRODUCING THE SAME
Filed April 3, 1963            4 Sheets-Sheet 2

United States Patent Office 3,245,134
Patented Apr. 12, 1966

3,245,134
CUTTING TOOL WITH CUTTER BARS SECURED TO A SUPPORTING BODY AND METHODS OF PRODUCING THE SAME
Walter Zorn, Eutingen, Baden, Germany, assignor to Walztechnik Saacke-Zorn KG., Pforzheim-Eutingen, Germany
Filed Apr. 3, 1963, Ser. No. 270,208
Claims priority, application Germany, Apr. 19, 1962, Z 9,367
6 Claims. (Cl. 29—105)

The present invention relates to cutting tools and especially to hobs and broaches, each of which consists of cutter bars which are secured to a supporting body. Hobs of this type are already known in which the back surfaces of the cutter bars are supported by bracing bars, the foot parts of which are inserted into mounting recesses which extend substantially in the axial direction in the peripheral surface of a cylindrical supporting body. In cooperation with clamping strips which likewise brace the back surfaces of the cutter bars and with guide rings on the end surfaces of the cutter bars, the bracing bars of these hobs which are secured to the supporting body by means of radial screws have the purpose of securing the cutter bars to the supporting body and to fix their positions with respect to this body so as to perimt used-up cutter bars to be easily and quickly exchanged for new bars even by an untrained person. The support of the back surfaces of the cutter bars by the bracing bars and lug strips of the known hobs therefore serves primarily for securing purposes. By securing the cutter bars by raidal screws, it is, however, extremely difficult to attain a uniform tension along all cutter bars. This may result in inaccuracies of the tool and especially in the danger that the cutter bars might loosen. It is obvious that especially when machining large workpieces, for example, large turbine wheels or gear wheels, a breakage of the tool due to loosening of cutter bars may cause very great damage. The known hobs have the further disadvantage that their construction is rather complicated and therefore very expensive.

Although the cutter bars of the hobs according to the present invention are likewise provided with bracing bars at the rear sides thereof, it may be pointed out at this time that these bracing bars are intended for a different purpose than those of the hobs as previously described.

It is a well-known fact that the cutter bars of such assembled tools consist of high-grade and expensive cutting materials, whereas the supporting bodies thereof consist of a normal structural steel or one which may be tempered and they are alloyed only to such an extent as is necessary to give them the required solidity for properly holding the cutter bars. This requirement is usually fulfilled, for example, for the cylindrical supporting bodies for hobs, by the normal condition in which these bodies are supplied by the steel-making plant or by an all-over heat treatment or, if especially desired, by tempering the wall of the bore of the supporting body. Generally, the cutter bars of such tools only project from the supporting body so far as is absolutely necessary in view of their shape. In the course of the use of such a tool it becomes necessary from time to time to regrind the cutter bars, whereby their thickness is gradually reduced to less than the thickness of the foot parts of the cutter bars. Depending upon the projecting length or height of the cutter bars, they become sooner or later liable to break, especially at the point where the head part which is ground off merges with the foot part of the original thickness which is secured in the supporting body. The practical result of these conditions is that such cutter bars which consist of a very expensive cutting material can hardly ever be economically utilized and that, because of the danger of their breakage, they must usually be discarded at a time long before they are ground off entirely and when they have not as yet been used for a sufficient length of time to render them really economical.

It is the principal object of the present invention to overcome this disadvantage by supporting the cutter bars at the rear sides thereof by means of special bracing bars.

There are also hobs with inserted cutted bars known of the type in which the cutter bars are braced at their rear sides by providing the peripheral surface of the cylindrical supporting body with integral bracing projections which extend parallel to its axis and upon which the rear surfaces of the cutting parts of the cutter bars engage so that the cutting pressure will be taken up substantially by these projections. This well-known construction has the disadvantage that the supporting body has to be a complicated and very expensive element of a high-grade material which has to be machined from solid stock and the cutter-bracing projections of which have to be made of a very accurate shape in accordance with the shape of the cutter bars. Furthermore, in order to give these bracing projections the required solidity, it is also necessary to harden the entire supporting body throughout whereby, due to its complicated shape hardening strains occur which result in a very great danger of breakage. This danger may become very serious especially when one of the cutter bars breaks as the result of which the respective bracing projection may also break. The breakage of a single bracing projetcion, however, usually means that the entire supporting body has to be thrown away or that at least the broken area thereof becomes useless. These points of breakage usually occur, however, near the center of the tool, that is, in the most important part of its working area.

The above-mentioned disadvantages of bracing the cutter bars by means of bracing projections on the supporting body are likewise overcome by the present invention.

The invention is therefore based upon a cutting tool which consists of cutter bars which are held by a supporting body, and of bracing bars of a cross sectional shape similar to that of the cutter bars which are inserted into mounting recesses in the peripheral surface of the supporting body and extend substantially transverse to the cutting direction of the tool and brace the cutter bars, and it is the principal feature of the invention that the bracing bars and the cutter bars are inserted in common mounting recesses in the supporting body and that the front surfaces of the bracing bars engage substantially fully with the rear surfaces of the cutter bars.

The head parts of the bracing bars may, however, also be inwardly offset relative to the head part of the cutter bars. According to one embodiment of the invention this may be attained by providing the bottom of each mounting recess with a flat bottom and by making the radial length of the cutter bars greater than that of the bracing bars, while according to another embodiment of the invention this offsetting of the bracing bars relative to the cutter bars may be attained by making the bottom of each mounting recess step-shaped and by inserting into these recesses cutter bars and bracing bars of an equal radial length so that the bracing bars will be set back inwardly relative to the cutter bars.

According to another feature of the invention, each of the bracing bars is made of a thickness substantially equal to one half of the width of each mounting recess. The bracing bars preferably consist of a very solid structural steel with a good bending strength and notch toughness. If they consist of such a material and if the cutter bars are made of a high-grade cutting material, for example, of a highly alloyed speed steel or a sintered material, the part of the supporting body in which the mounting recesses are provided does not need be tempered.

According to a particular embodiment of the invention, the cutter bars and bracing bars may be slightly tapered inversely to each other in the direction toward the mounting recesses, while according to a modification of the invention each cutter bar and bracing bar may be tapered inversely to each other in relation to a plane extending vertically to the bottom of the associated mounting recess.

The cutter and bracing bars may be secured in the mounting recesses of the supporting body by means of conventional securing elements, that is, in the case of hobs by locking rings which engage over corresponding projections on the cutter and bracing bars. According to a preferred embodiment of the invention in the form of a hob, the lateral end surfaces of the cutter and bracing bars are made slightly conical and engage upon corresponding conical countersurfaces of locking rings which are adapted to be secured to the supporting body so as to be immovable in the axial direction. If desired, a suitable filler which is capable of hardening to a very high solidity may be inserted between the conical surfaces of the cutter and bracing bars and those of the locking rings.

The present invention further relates to a method of circular machining the cutter bars for hobs embodying the features of the invention by means of a cylindrical rotary work support which has substantially the same diameter as the supporting body of the hob to be produced and is provided with mounting recesses which are equally inclined to the radii of the work support and permit approximately twice as many cutter bars to be simultaneously machined as are required for one hob. The same method may also be employed for machining the bracing bars according to the invention in which case likewise a cylindrical rotary work support is used in which the mounting recesses are also eccentrically inclined to the radii of the work support.

According to one embodiment of the inventive method, a common rotary work support is employed for machining the cutter and bracing bars together which are inserted in pairs in mounting recesses of a suitable width in the work support and are eccentrically inclined to the radii of the work support. If the head parts of the bracing bars are to be offset or staggered relative to those of the cutter bars, the bracing bars may be subsequently reduced in length at their bottom ends by a separate operation. According to a modification of the inventive method, the cutter and bracing bars may for the same purpose be machined together in a single rotary work support in which the bottom of each mounting recess is step-shaped and the cutter bars are inserted into the deeper parts of these recesses.

The features and advantages of the present invention will become more clearly apparent from the following detailed description thereof which is to be read with reference to the accompanying drawings, in which FIGURE 1 shows a diagrammatic end view of a part of a hob according to the invention;

FIGURE 9 shows a diagrammatic end view of a rotary work support for machining the cutter and bracing bars together; while

Figure 1:
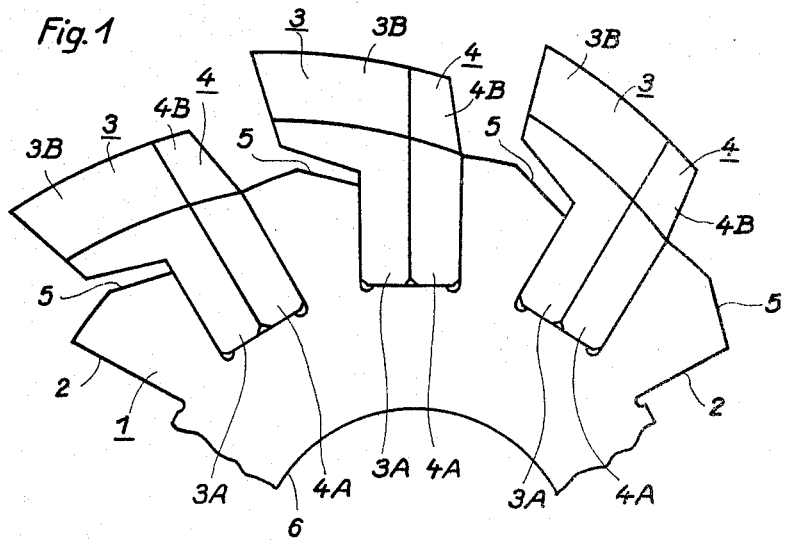

Referring to the drawings, the cylindrical supporting body 1 of the hob according to the invention as illustrated in FIGURE 1 is provided in a conventional manner with equally spaced recesses 2 in its peripheral surface which extend parallel to the axis of the body 1 and the central radial planes of which preferably intersect with this axis. The opposite walls of each of these recesses 2 preferably extend parallel to each other and parallel to the central radial plane of the recess, and the plane bottom of each recess forming a seat preferably lies within a tangential plane. According to the present invention, each of the recesses 2 contains a cutter bar 3 and a bracing bar 4 which are inserted therein in such a manner that the plane rear surface of the cutter bar 3 engages with the plane front surface of the bracing bar 4. The front and rear surfaces of the foot part 3A of each cutter bar and of the foot part 4A of each bracing bar are preferably plane and parallel to each other and extend vertically to the bottom surfaces of these foot portions. The total thickness of each pair of foot parts 3A and 4A corresponds so closely to the width of the respective recess 2 that when the two foot parts lying flat on each other are inserted into the recess, they will be firmly seated therein and engage fully with the walls thereof. The shape of the head part 3B of each cutter bar 3 and the shape of the head part 4B of each bracing bar 4 are preferably congruent with each other so that their respective surfaces are in alignment with each other and, as shown in FIGURE 1, the rear lower edge of the head portion 4B projects only slightly above the peripheral surface of the cylindrical body 1. For securing the cutter bars 3 and bracing bars 4 in radial directions, conventional securing means may be provided, for example, locking rings which engage over suitable shoulders on both ends of the bars. According to a preferred embodiment of the invention, the end surfaces of cutter bars 3 and bracing bars 4 are slightly conical (not shown in the drawing) and engage—preferably through an intermediate rigidly hardening filler—with corresponding conical surfaces of the locking rings which may be secured in a conventional manner to the cylindrical body 1 so as to be immovable in the axial direction.

The bottom surfaces of the foot parts 3A and 4A of the cutter and bracing bars engage fully with the plane tangential bottom surfaces of recesses 2. The heads 3B of new cutter bars 3 project considerably beyond the foot parts 3A in the cutting direction and for reasons of stability their lower edges project from the foot parts 3A in an oblique outward direction. In order to make these oblique edges of the most suitable shape and to start them at the lowest possible point of the straight foot parts 3A, the cylindrical body 1 may be undercut at 5 at the front edges of recesses 2.

The cylindrical supporting body 1 may as usual consist of a normal or tempered steel and may be just sufficiently alloyed so as to possess the required solidity for properly holding the cutter and bracing bars 3 and 4. Although the condition in which the cylindrical body 1 is delivered from the manufacturer is generally sufficient for this purpose, it may, if necessary, be subjected to an all-over heat treatment. If desired, the wall of the central bore 6 of the cylindrical body 1 may be tempered. The cutter bars 3 consist of a high-grade cutting material, for example, a high-alloyed, high-speed tool steel or a very hard sintered material. Since such high-grade cutting materials have a very low tenacity, they easily tend to break when subjected to strong tensile or bending stresses. According to the invention, these stresses are taken up by the bracing bars 4 which are likewise made of a very rigid and tough material. Since their front surfaces engage fully with the rear surfaces of the cutter bars 3, these bracing bars 4 are easily capable of taking up the forces resulting from the cutting pressure.

As already mentioned, the surfaces of the head parts 3B of the cutter bars 3 of the hob according to FIGURE 1 continue without interruption into the congruent surfaces of the head parts 4B of the bracing bars 4. In order to attain a good chip formation, it is advisable to make the rear surfaces of the head parts of the bracing bars slightly inclined, as shown in FIGURE 1.

Figure 2:
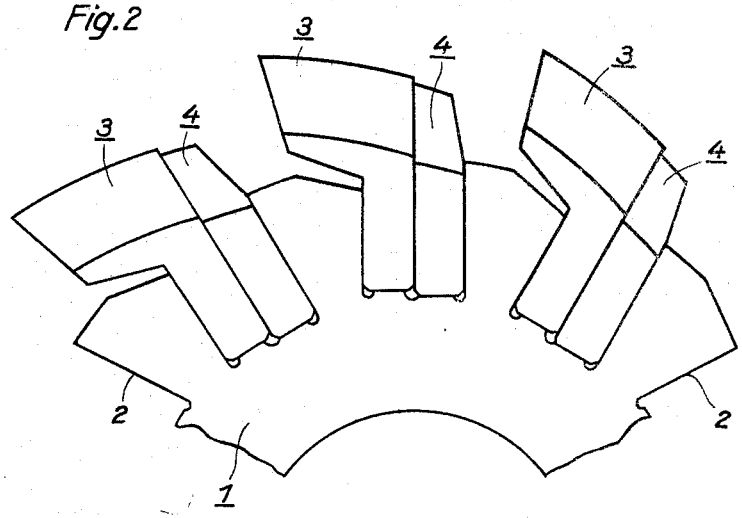
FIGURE 2 shows a similar view of a part of a hob according to a modification of the invention.
Figure 3:
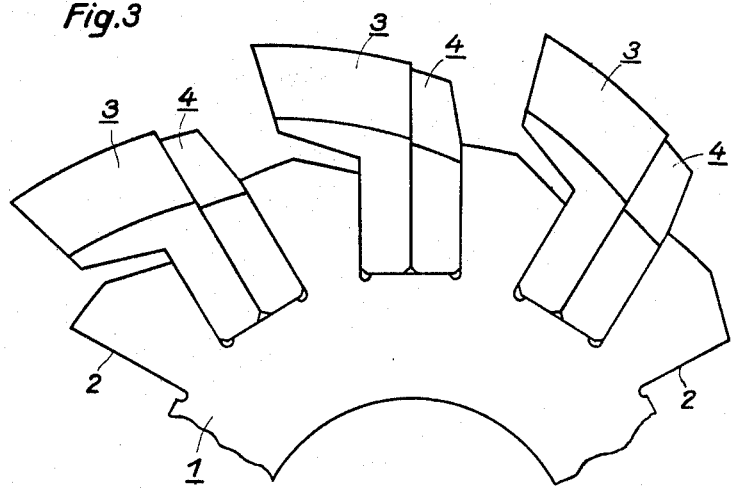
FIGURE 3 shows a similar view of a part of a hob according to another modification of the invention.

For certain purposes it may be advisable to offset or stagger the surfaces of the head parts 4B of bracing bars 4 relative to those of the cutting parts of cutter bars 3. This may according to the invention be done either in the manner as illustrated in FIGURE 2 or in the manner as illustrated in FIGURE 3. According to FIGURE 2, the bottom of the recesses 2 in the supporting body 1 is step-shaped so that the cutter bars 3 project slightly further outwardly of the peripheral surface of body 1 than the bracing bars 4. Of course, the production of such step-shaped bottom surfaces of the recesses 2 entails additional work in the production of the cylindrical body 1. This work may be avoided by making the recesses 2 of the same shape with straight bottom surfaces as those in FIGURE 1 and by shortening the lower ends of the bracing bars 4 as indicated in FIGURE 3. This, however, means that, after being made in accordance with the cutter bars 3, as shown in FIGURE 1, the bracing bars 4 have to be ground off at their lower ends to reduce them to the desired length.

Figure 4:
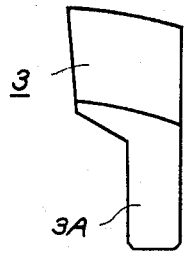
FIGURE 4 shows a diagrammatic end view of a finished cutter bar for a hob according to the invention.
Figure 5:
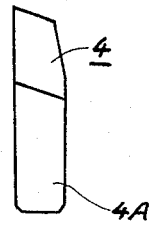
FIGURE 5 shows a diagrammatic end view of a finished bracing bar for a hob according to the invention.

In the new condition, the cutter bars 3 preferably have the shape as illustrated in the end views according to FIGURES 1 to 4, and the bracing bars have the shape as also shown in FIGURES 1 to 3 and in FIGURE 5. The foot parts 3A of the cutter bars and the foot parts 4A of the bracing bars are preferably made of the same thickness. In certain cases it may, however, be desirable to make the foot parts 3A of the cutter bars of a smaller thickness than the foot parts 4A of the bracing bars so that if the width of the recesses 2 remains unchanged the thickness of the foot parts 4A of the bracing bars is increased by the same amount by which the foot parts 3A of the cutter bars are reduced.

Figure 6:
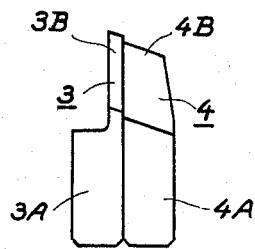
FIGURE 6 shows a diagrammatic end view of a pair of cutter and bracing bars according to FIGURES 4 and 5, wherein the cutter bar is very strongly ground off.

FIGURE 6 illustrates the combination of a cutter bar 3 with a bracing bar 4 according to the invention, in which the cutter bar 3 is ground off almost entirely. It is already evident from this drawing that the head part 3B would break off easily under the normal cutting pressure if it were not supported by the head part 4B of the bracing bar 4. It is likewise evident that, as compared with cutter bars of prior constructions, the present invention not only produces a considerable saving in valuable cutting material by reducing the thickness of the foot part 3A of the cutter bars to one half of the usual thickness, but also by permitting the cutting parts 3B to be used for a much longer time, namely, until they are ground off almost completely. Thus, not only a saving of more than 50% in cutting material is made in the production of the cutter bars, but because of a better and more complete utilization of the cutter bars in the operation of the tool, its economical usefulness is often more than 100% greater than that of the known tools of this type. Apart from this, its construction is so extremely simple that its production may be carried out at a much lower expense than that of the known tools.

Due to the special construction and arrangement of the cutter and bracing bars according to the invention it is possible to produce these bars either together or separately by means of very simple and economical methods. These methods which also constitute a part of the invention are hereafter described with reference to FIGURES 7 to 10 of the drawings.

Figure 7:
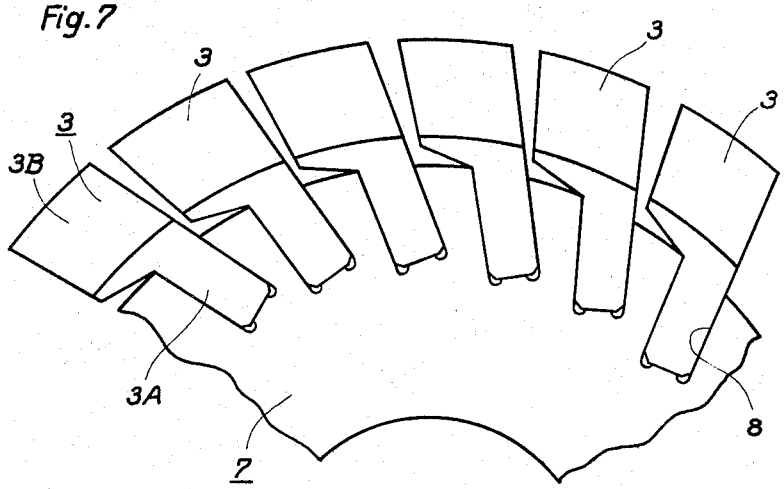
FIGURE 7 shows a diagrammatic end view of a rotary work support for machining the cutter bars according to the invention.

FIGURE 7 shows a diagrammatic end view of a part of a cylindrical rotary work support for machining the cutter heads of cutter bars 3. This work support 7 has substantially the same outer diameter as the supporting body 1 as previously described. The peripheral surface of the work support 7 is provided with equally spaced mounting recesses 8 which extend parallel to the axis of the cylindrical body and have such a size and shape that the foot parts 3A of the cutter bars 3 which are to be machined may be mounted therein. The central planes of recesses 8 are eccentrically disposed relative to the axis of the work support 7 so that the cutting heads 3B of cutter bars 3 which are machined on the support 7 will be given the proper inclination relative to the tangents of the cylindrical supporting body 1, as shown in FIGURES 1 to 3.

FIGURE 7 illustrates that the cutting heads 3B may be machined very easily in a conventional manner and that, even though the work support 7 has substantially the same outer diameter as the supporting body 1, it permits the simultaneous production of approximately twice the number of cutter bars 3 of a shape as shown in FIGURE 4 than the number of cutter bars which can normally be mounted on a supporting body 1. The machining may therefore be carried out much more economically than prior to this invention and regardless of the particular shape of the desired cutter bars. Thus, for example, the cutting heads 3B of the cutter bars 3 may be serrated or be made of any other irregular shape, provided that the cutting heads 3B still project over the outer peripheral surface of the supporting body 1 when the cutter bars are inserted into the latter.

Figure 8:
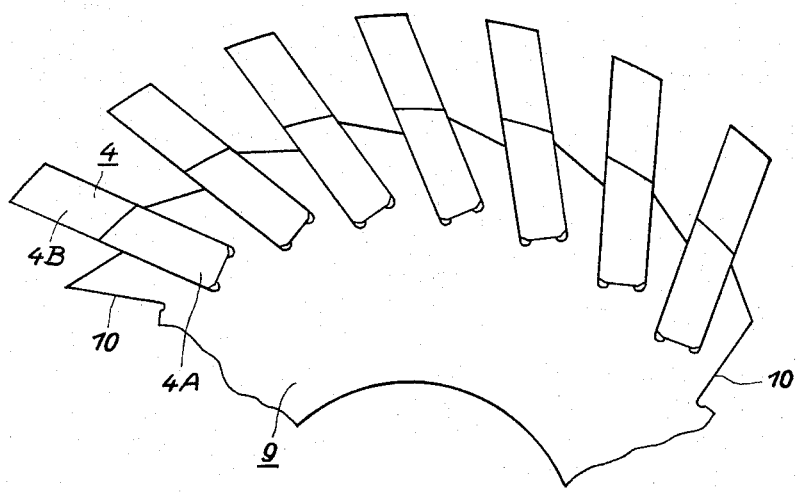
FIGURE 8 shows a diagrammatic end view of a rotary work support for machining the bracing bars according to the invention.

If the foot parts 3A of the cutter bars are made of a thickness equal to that of the foot parts 4A of the bracing bars 4, a similar rotary work support 9 may be employed as the work support 7 according to FIGURE 7. It is then merely necessary to increase the degree of eccentricity of the central planes of the mounting recesses 10 in the work support 9 so as to be greater than that of the central planes of the mounting recesses 10 in the work support 9 so as to be greater than that of the central planes of the mounting recesses 8 in the work support 7 so that the cutter bars 3 and bracing bars 4 may be properly associated in pairs in the assembled tool. The shape and dimensions of the mounting recesses 10 of the work support 9 again correspond to the shape and dimensions of the bracing bars 4A. Since according to the invention the head parts 4B of the bracing bars 4 are congruent with the cutting heads 3B of bracing bars 3, the head parts 4B may be machined on the work support 9 with the same tool which is used according to FIGURE 7 for machining the cutting heads 3B of cutter bars 3. Also, in this case, the machining operation is of a simple rotary type without requiring any special means or manipulations and as shown in FIGURE 8 a much greater number of bracing bars may also in this case be machined simultaneously on the work support 9 than are mounted on a supporting body 1 of the same outer diameter. The mounting recesses 10 in the work support 9 may either be made of such a depth as compared with that of the mounting recesses 8 in the work support 7 that the cutter bars 3 and bracing bars 4 will have the same height for producing hobs as illustrated in FIGURE 1 or FIGURE 2, or the depth of the mounting recesses 10 in the work support 9 may be made slightly smaller so that bracing bars may be produced on the work support 9 which may be employed for hobs according to FIGURE 3. In the latter case it is then only necessary for completing the bracing bars to grind the back of each head part 4B to the desired inclination.

Figure 9:
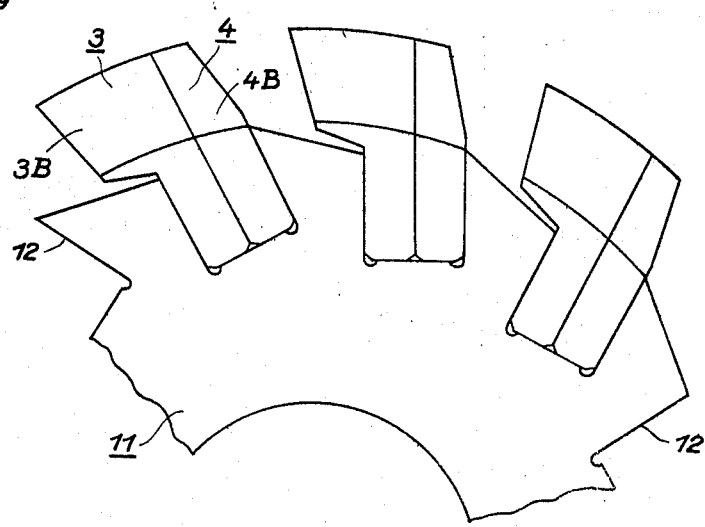

FIGURE 9 illustrates a cylindrical work support 11 for machining cutter bars 3 and bracing bars 4 simultaneously for hobs according to FIGURE 1. The mounting recesses 12 in the work support 11 correspond in shape and dimensions to the mounting recesses 2 in the supporting body 1, and merely the central planes of mounting recesses 12 are given the required eccentricity relative to the axis of the work support 11. Also in this case the shape of the cutting and bracing heads 3B and 4B is attained by a simple circular machining operation. The work support 11 may also be used for simultaneously machining the cutter bars 3 and bracing bars 4 for hobs according to FIGURE 2.

Figure 10:
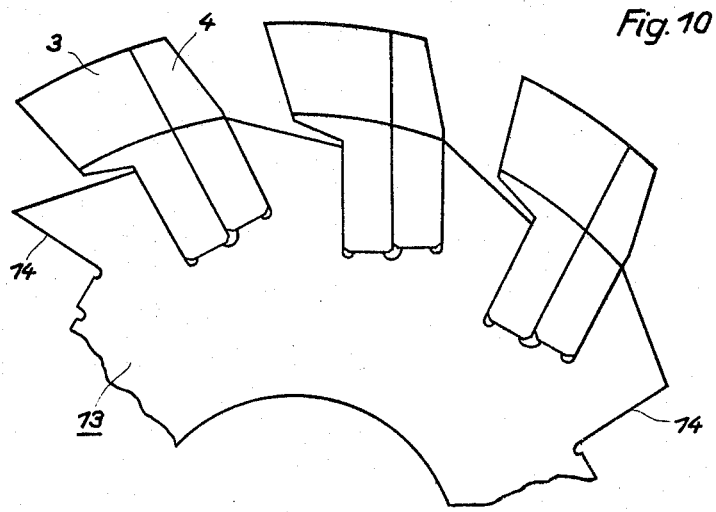
FIGURE 10 shows a diagrammatic end view of a modification of the rotary work support for machining the cutter and bracing bars together.

FIGURE 10 finally illustrates a work support 13 for simultaneously machining cutter bars 3 and bracing bars 4 for hobs according to FIGURE 3. The bottom surfaces of the mounting recesses 14 are step-shaped similarly as shown in the supporting body 1 of the hob according to FIGURE 2, but inversely thereto. The simultaneous machining of the cutter bars 3 and bracing bars 4 on a work support 13 is again a simple rotary operation without any additional manipulations.

It is of course always the most difficult operation to machine the profiles of the cutter bars since they have to be of an extreme accuracy in the dimensions and pitch. From the foregoing description it is evident that this difficult operation will be rendered very simple and easy by proceeding according to the method as illustrated in FIGURES 7 to 10. From FIGURE 7 it is also apparent that the distances between the adjacent cutter bars 3 outwardly of the peripheral surface of the work support 7 are very small so that in machining the cutter bars the respective tool will remain in engagement with them almost continuously. The vibrations of the tool which would otherwise occur and the inaccuracies which are due to such vibrations are thus avoided.

The cutter and bracing bars may also be made slightly tapered inversely to each other in the direction of the mounting recesses. This taper should only amount to a few hundredths of a millimeter. It permits an accurate predetermination of the tension at which the cutter bars 3 and bracing bars 4 are secured in the mounting recesses of the supporting body. In place of such a slight taper of the cutter and bracing bars in the direction of the mounting recesses, it is also possible to make these bars slightly tapered in the direction vertical to the bottom surfaces of the mounting recesses.

As already mentioned above, the supporting body 1 does not need to be made of an especially high-grade material. If the supporting body 1 is tempered in order to increase the solidity of the wall of its central bore, there is no need also to temper it peripherally. Dangerous tensions within the supporting body will thus be avoided which, in turn, means that the danger of breakage of the tool will be reduced.

The invention therefore not only permits the production of simple and inexpensive tools and a better utilization of the expensive high-grade cutting material which is required for producing the cutter bars, but it also results in a much greater safety from breakage of the tools than is attainable in similar tool constructions of the prior art.

Although the invention has been described primarily with reference to the production of hobs, it is obviously also applicable to other types of cutting tools in which cutter bars are secured in a supporting body, for example, to broaches.

Having thus fully disclosed my invention, what I claim is:

1. A hob comprising a circular supporting body having an axial bore and having cutter mounting recesses in the peripheral surface thereof extending substantially transverse to the cutting direction, cutter bars disposed in said recesses and projecting outwardly of the periphery of said body, each cutter bar having a front surface engaging one wall of the recess and with the entire rear surface plane and uninterrupted, bracing bars disposed in said recesses and projecting outwardly of the periphery of said body, each bracing bar having the entire front surface plane and uninterrupted in intimate engagement with the rear surface of the adjacent cutter bar and a rear surface engaging the outer wall of the recess, the portion of each bracing bar projecting outwardly of the periphery of said body having a cross sectional shape similar to that of the corresponding projecting portion of the adjacent cutter bar and each bracing bar having a thickness substantially equal to one-half the width of each mounting recess, whereby said bracing bars serve to engage and support said cutter bars over substantially the entire rear surface of said cutter bar.

2. A hob as defined in claim 1, wherein the bracing bars project from the supporting body a distance less than that of the cutter bars.

3. A hob as defined in claim 1, wherein each mounting recess is provided with a plane uninterrupted bottom surface and the cutter bars have a height greater than the height of the bracing bars.

4. A hob as defined in claim 2, wherein the cutter and bracing bars have the same length and the mounting recesses are provided with stepped bottom surfaces, whereby the bottom surfaces of the recesses engaging with the bottom surfaces of the bracing bars are disposed radially inwardly of the bottom surfaces of the recesses engaging with the bottom surfaces of the cutter bars.

5. A hob as defined in claim 1, in which the cutter bars consist of a high-grade cutting material and the bracing bars consist of a very solid structural steel having a good bending strength and notch toughness.

6. A hob as defined in claim 1, in which the part of the supporting body adjacent to its bore is tempered while the part thereof containing the mounting recesses is not tempered.

References Cited by the Examiner

UNITED STATES PATENTS

| | | | |
|---|---|---|---|
| 75,219 | 3/1868 | Taylor | 29—105 |
| 82,402 | 9/1868 | Harrington | 29—105 |
| 509,145 | 11/1893 | Thomson | 29—105 |
| 1,073,873 | 9/1913 | Smith | 29—105 |
| 1,077,271 | 11/1913 | Gorton | 29—105 |
| 1,144,015 | 6/1915 | Wiemer | 269—55 |
| 1,443,642 | 1/1923 | Muller | 76—101 |
| 1,483,950 | 2/1924 | Peterson | 29—105 X |
| 1,874,536 | 8/1932 | Irwin | 76—101 |
| 2,001,021 | 5/1935 | Heard | 29—105.1 X |
| 2,368,077 | 1/1945 | McCarthy | 269—55 |
| 2,422,111 | 6/1947 | Lundberg | 29—105 |
| 2,567,167 | 9/1951 | Drader | 29—105 |
| 2,693,020 | 11/1954 | Pelphery | 29—105 |
| 2,706,848 | 4/1955 | Riley | 29—105 |
| 3,060,554 | 10/1962 | Kirchner | 39—105 X |
| 3,104,453 | 9/1963 | Greenleaf | 29—105 |

FOREIGN PATENTS

| | | |
|---|---|---|
| 911,933 | 5/1954 | Germany. |
| 13,299 | 7/1892 | Great Britain. |
| 872,613 | 7/1961 | Great Britain. |
| 61,492 | 7/1912 | Switzerland. |

WILLIAM W. DYER, Jr., *Primary Examiner.*